(12) United States Patent
Berlingieri et al.

(10) Patent No.: US 11,511,589 B2
(45) Date of Patent: Nov. 29, 2022

(54) ADJUSTABLE SUSPENSION MOUNT ASSEMBLY

(71) Applicant: Rassini Suspensiones, S.A. de C.V., Del. Miguel Hidalgo (MX)

(72) Inventors: Anthony Berlingieri, Plymouth, MI (US); José Guadalupe Ruiz Juárez, Coahuila (MX); Aaron N. Johnson, Westland, MI (US); Ramón Heberto Diego Guedea, Ann Arbor, MI (US); James N. Zeimet, Commerce Township, MI (US); Juan Jose Wong, Coahuila (MX)

(73) Assignee: Rassini Suspensiones, S.A. de C.V.

( * ) Notice: Subject to any disclaimer, the term of this patent is extended or adjusted under 35 U.S.C. 154(b) by 76 days.

(21) Appl. No.: 16/545,547

(22) Filed: Aug. 20, 2019

(65) Prior Publication Data

US 2020/0055360 A1 Feb. 20, 2020

Related U.S. Application Data

(60) Provisional application No. 62/719,976, filed on Aug. 20, 2018.

(51) Int. Cl.
*B60G 17/02* (2006.01)
*B60G 17/00* (2006.01)
*B60G 17/015* (2006.01)
*B60G 17/019* (2006.01)

(52) U.S. Cl.
CPC ........... *B60G 17/023* (2013.01); *B60G 17/00* (2013.01); *B60G 17/015* (2013.01); *B60G 17/019* (2013.01); *B60G 2202/43* (2013.01); *B60G 2500/30* (2013.01); *B60G 2600/182* (2013.01); *B60G 2600/20* (2013.01)

(58) Field of Classification Search
CPC ......................... B60G 17/015; B60G 17/0157; B60G 17/019; B60G 17/023; B60G 2500/30; B60G 2202/42
See application file for complete search history.

(56) References Cited

U.S. PATENT DOCUMENTS

| | | | | |
|---|---|---|---|---|
| 2,998,970 A | * | 9/1961 | Latta ................... | B60G 17/023 280/6.159 |
| 3,083,034 A | * | 3/1963 | Hollowell ............ | B60G 17/023 280/6.159 |
| 3,170,712 A | * | 2/1965 | Hildebrandt ......... | B60G 17/023 280/6.15 |
| 3,484,091 A | * | 12/1969 | Draves .................. | B60G 11/36 267/265 |
| 3,954,232 A | * | 5/1976 | Harper .................. | B64C 25/001 244/102 R |
| 4,800,751 A | * | 1/1989 | Kobayashi ........... | B60G 15/068 73/117.03 |
| 4,892,328 A | * | 1/1990 | Kurtzman .......... | B60G 17/0157 188/267 |

(Continued)

*Primary Examiner* — Frank B Vanaman
(74) *Attorney, Agent, or Firm* — Dickinson Wright PLLC

(57) ABSTRACT

An adjustable suspension mount assembly includes a bracket coupled to a suspension mounting component and coupled to a frame component of the vehicle. The assembly also includes a vertical adjustment assembly operatively coupled to the bracket. The assembly further includes an electric motor operatively coupled to the vertical adjustment assembly to adjust the vertical position of the bracket.

13 Claims, 7 Drawing Sheets

(56) References Cited

U.S. PATENT DOCUMENTS

| | | | | |
|---|---|---|---|---|
| 5,028,073 A * | 7/1991 | Harms | ............... | B60G 17/0157 |
| | | | | 280/5.501 |
| 5,224,512 A * | 7/1993 | Nogami | .................. | F16K 37/00 |
| | | | | 137/552 |
| 8,668,215 B2 * | 3/2014 | Juriga | .................. | B60G 17/023 |
| | | | | 280/124.174 |
| 2002/0084599 A1 * | 7/2002 | Charaudeau | ....... | B60G 17/0157 |
| | | | | 280/5.5 |
| 2005/0230201 A1 * | 10/2005 | Kondou | .................. | F16F 15/03 |
| | | | | 188/267 |
| 2006/0060750 A1 * | 3/2006 | Alexandridis | ....... | B60G 17/021 |
| | | | | 248/588 |
| 2018/0156303 A1 * | 6/2018 | Toyohira | ............... | F16F 13/002 |

\* cited by examiner

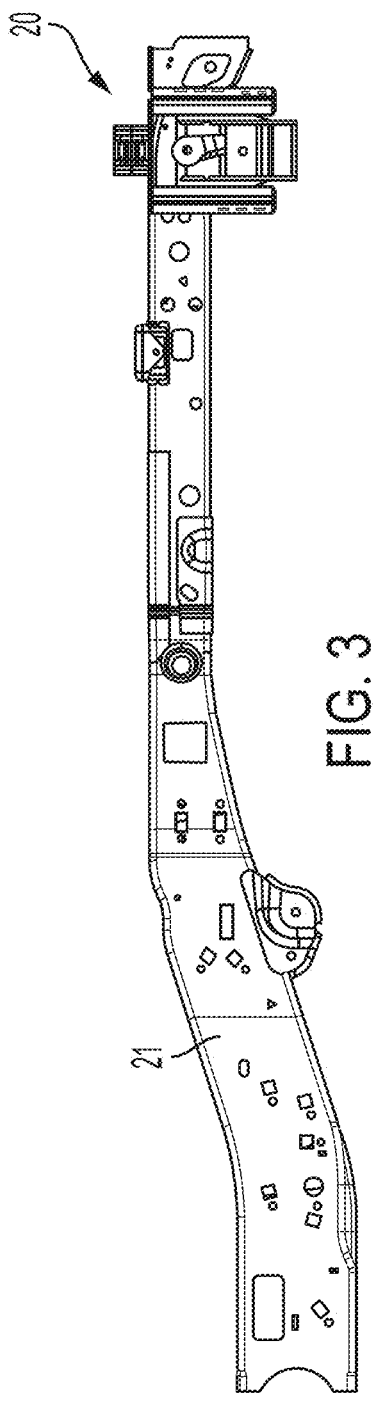
FIG. 3
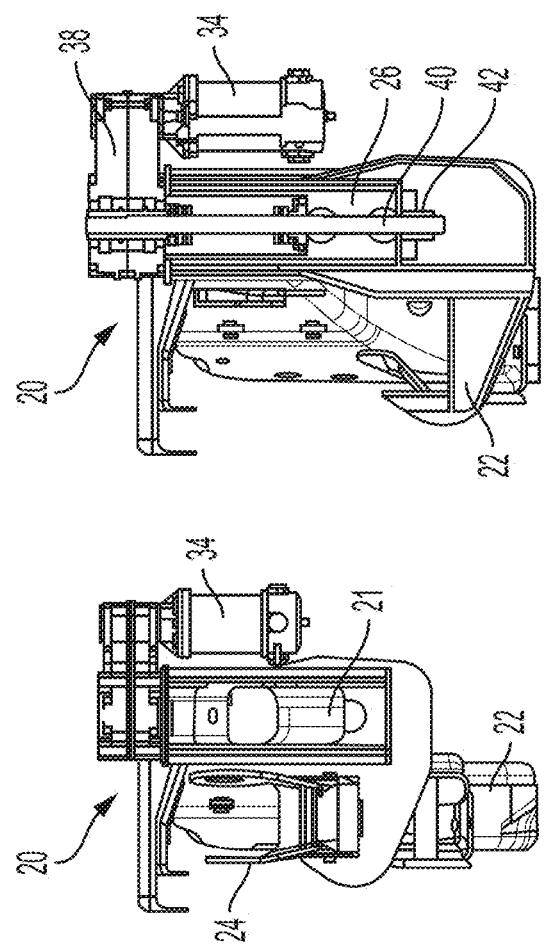
FIG. 5
FIG. 6
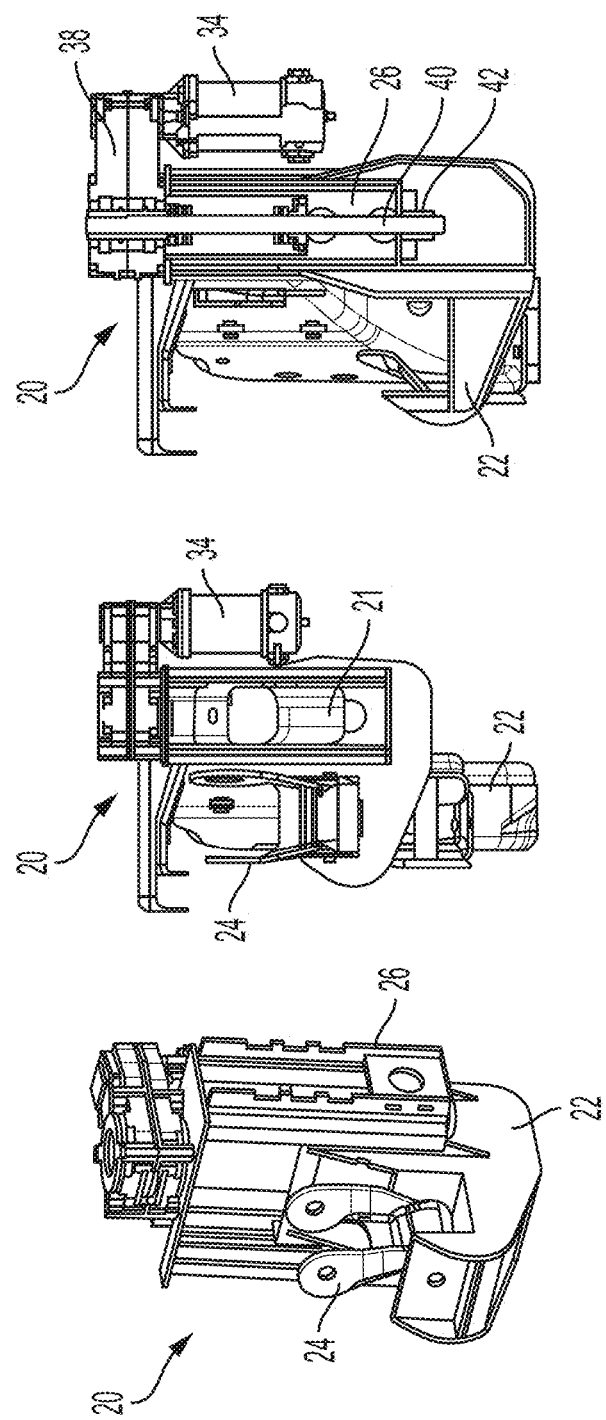
FIG. 4

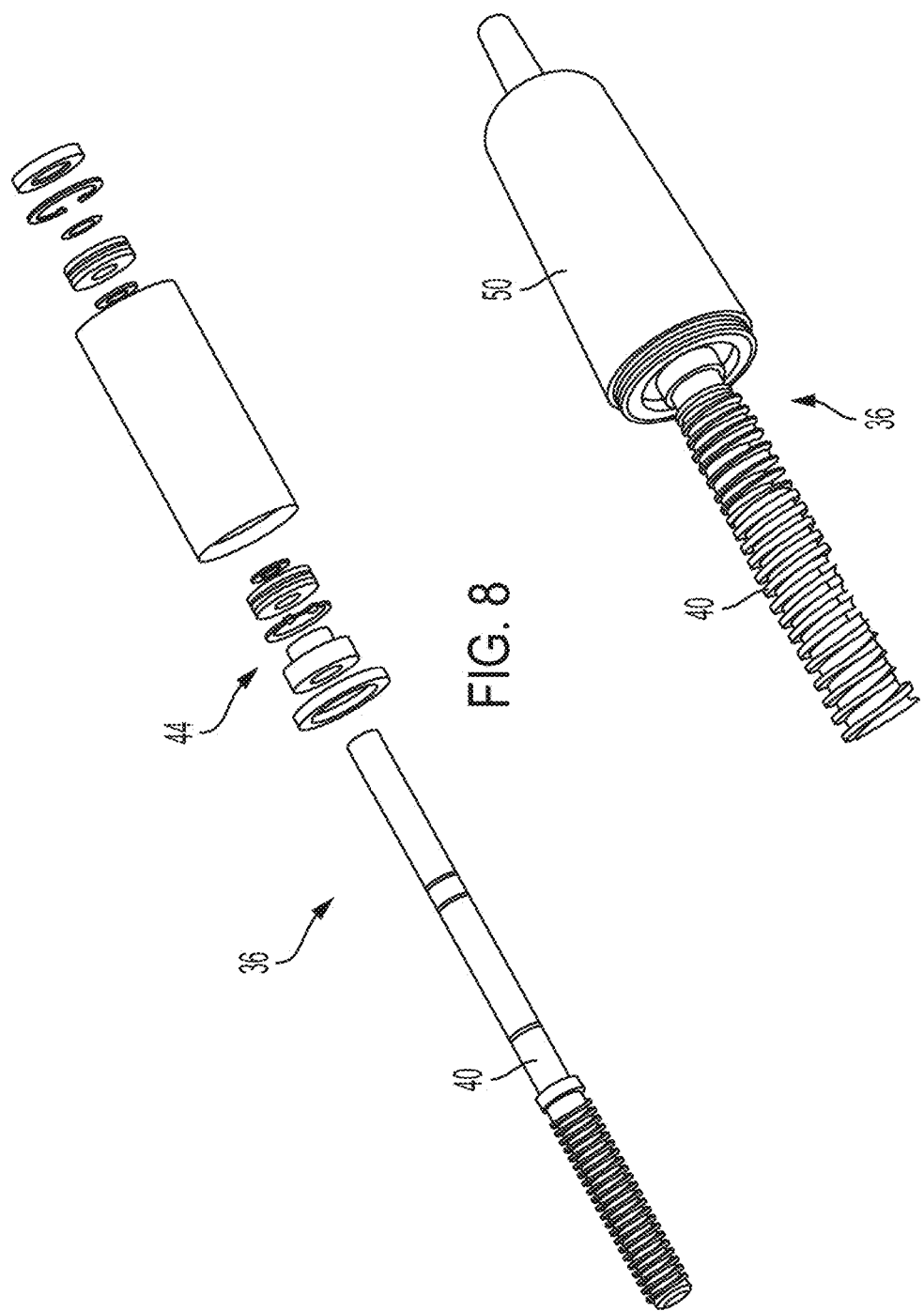

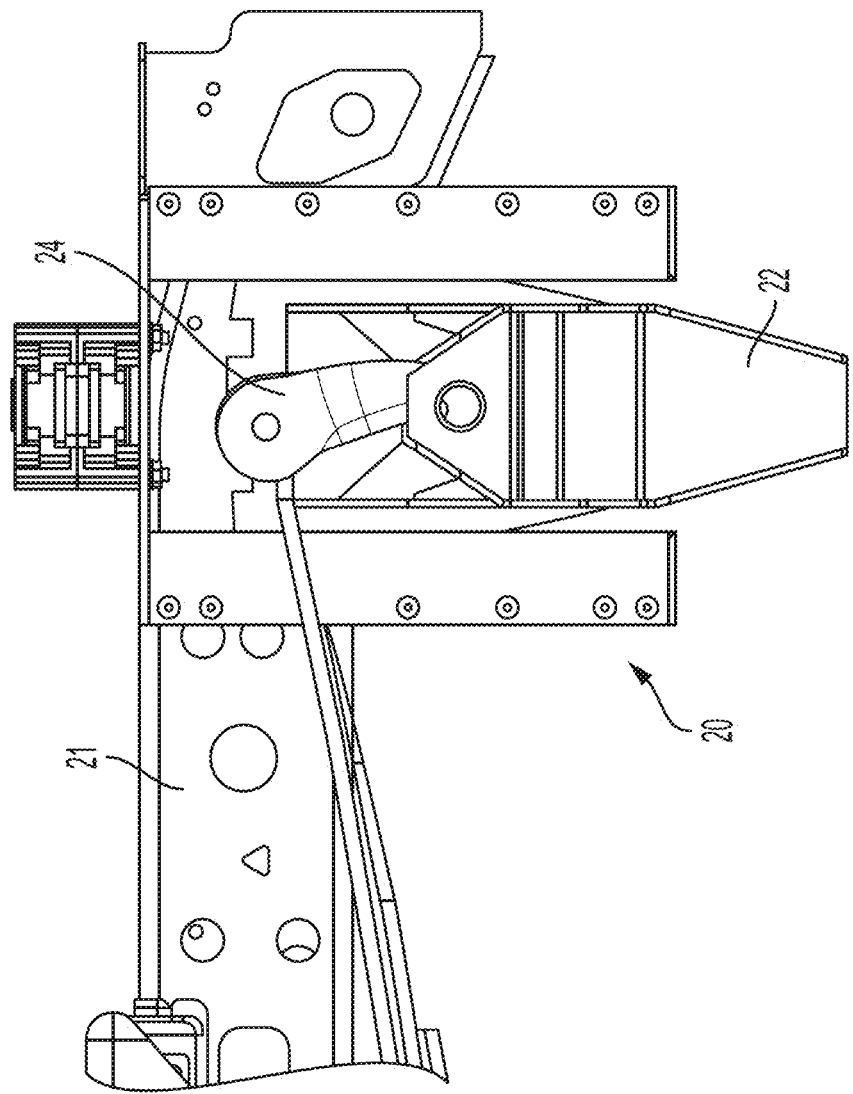

ADJUSTABLE SUSPENSION MOUNT ASSEMBLY

CROSS-REFERENCE TO RELATED APPLICATION

This application claims priority to, and the benefit of, U.S. Provisional Patent Application Ser. No. 62/719,976, filed on Aug. 20, 2018, the disclosure of which is incorporated by reference in its entirety herein.

BACKGROUND

Some vehicles may be designed for loading at a rearward location of the vehicle, as in the case of a bed of a pickup truck, for example. When loaded, the rear portion of the vehicle is moved downward due to the load and the forward portion of the vehicle may tilt upward or be higher than the rear end in such cases. Such an orientation reduces front down force of the vehicle and reduces braking performance. Additionally, the higher front end increases a drag coefficient, thereby increasing fuel consumption.

Suspension systems for vehicles assist with ride stability under various driving and load conditions. Suspension systems that are directly coupled to an axle or wheel of the vehicle result in the above-described vehicle tilting and the undesirable attributes that accompany such tilting.

SUMMARY OF THE INVENTION

According to one aspect of the disclosure, an adjustable suspension mount assembly is provided. The assembly includes a bracket coupled to a suspension mounting component and coupled to a frame component of the vehicle. The assembly also includes a vertical adjustment assembly operatively coupled to the bracket. The assembly further includes an electric motor operatively coupled to the vertical adjustment assembly to adjust the vertical position of the bracket.

According to another aspect of the disclosure, an adjustable suspension mount assembly is provided. The assembly includes a suspension mounting component coupled to a frame component of the vehicle. The assembly also includes a vertical adjustment assembly operatively coupled to the suspension mounting component, the vertical adjustment assembly comprising a lead screw and a linkage assembly, the linkage assembly linkage assembly operatively coupled to the lead screw and to the suspension mounting component. The assembly further includes an electric motor operatively coupled to the lead screw.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a side, elevational view of a vehicle chassis rail having an adjustable suspension mount assembly coupled thereto;

FIG. 4 is a perspective view of the adjustable suspension mount assembly according to an aspect of the disclosure;

FIG. 5 is a first elevational view of the adjustable suspension mount assembly of FIG. 4;

FIG. 6 is a second elevational view of the adjustable suspension mount assembly of FIG. 4;

FIG. 8 is a disassembled view of a portion of an adjustment mechanism;

FIG. 9 is an assembled view of the portion of the adjustment mechanism;

FIG. 14 is an elevational view of the adjustable suspension mount assembly utilized with a leaf spring suspension.

DETAILED DESCRIPTION

Figure 1:
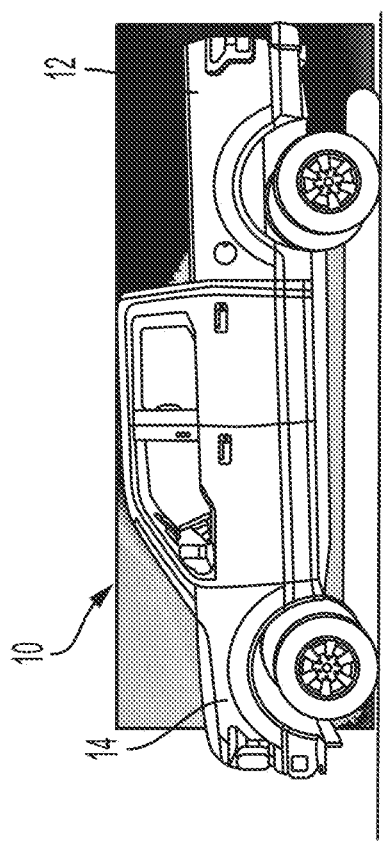
FIG. 1 is a perspective view of a vehicle in an unloaded condition.
Figure 2:
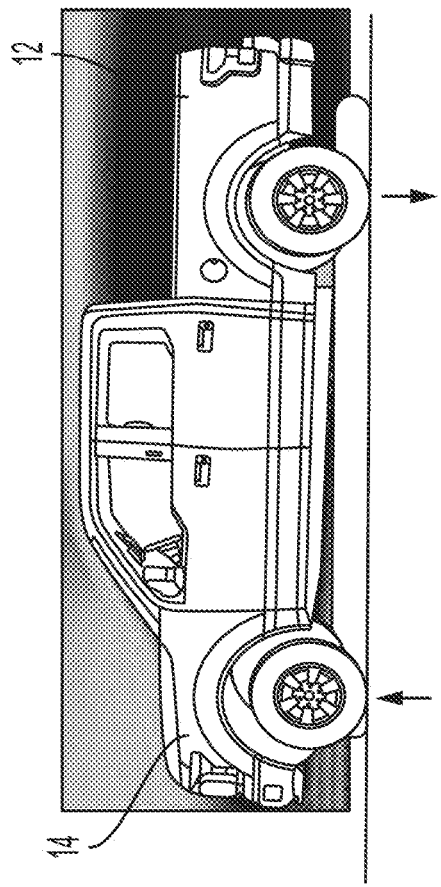
FIG. 2 is a perspective view of the vehicle in a loaded condition.

Referring to FIGS. 1 and 2, a vehicle 10 is shown in an unloaded condition (FIG. 1) and a loaded condition (FIG. 2). In particular, the rear end (i.e., rear half of vehicle in longitudinal direction) is shown in a loaded condition in FIG. 2. As shown, the loaded condition leads to a tilted orientation of the vehicle 10, with a rear portion 12 of the vehicle 10 being lower than a forward portion 14 of the vehicle 10. If driven in such an orientation, various undesirable attributes occur, such as reduced front down force of the vehicle 10 and reduced braking performance. Additionally, the higher front end increases a drag coefficient, thereby increasing fuel consumption. Although a truck is the type of vehicle 10 illustrated in FIGS. 1 and 2, it is to be understood that the embodiments described herein may be employed on various other types of vehicles.

FIG. 3 illustrates an adjustable suspension mount assembly 20 which may be utilized with an overall suspension assembly. The type of suspension assembly may vary, including a leaf spring suspension system, as shown in FIG. 14, or a coil spring suspension system. It is to be appreciated that the embodiments of the adjustable suspension mount assembly 20 disclosed herein may be utilized with a coil spring system that is positioned anywhere in the vehicle, including with front mounted coils and/or rear mounted coils. These are merely examples of suspension systems that may benefit from the adjustable suspension mount assembly 20 described herein.

The adjustable suspension mount assembly 20 is operatively coupled to a chassis rail 21 of the frame of the vehicle 10. Although shown as being coupled to the chassis rail 21, it is to be understood that the adjustable suspension mount assembly 20 may be operatively coupled to one or more other frame structures, such as a cross car structure rather than a structure extending in a longitudinal direction of the vehicle 10. As will be appreciated from the disclosure herein, the adjustable suspension mount assembly 20 separates the frame from an axle of the vehicle to raise the frame near the rear portion 12 of the vehicle 10 during a loaded condition of the vehicle 10 to compensate for what would otherwise be a tilted condition of the vehicle 10. Additionally, certain driving conditions, such as high speed driving, for example, may result in a tilted condition that may be compensated for by the adjustable suspension mount assembly 20 disclosed herein.

Figure 7:
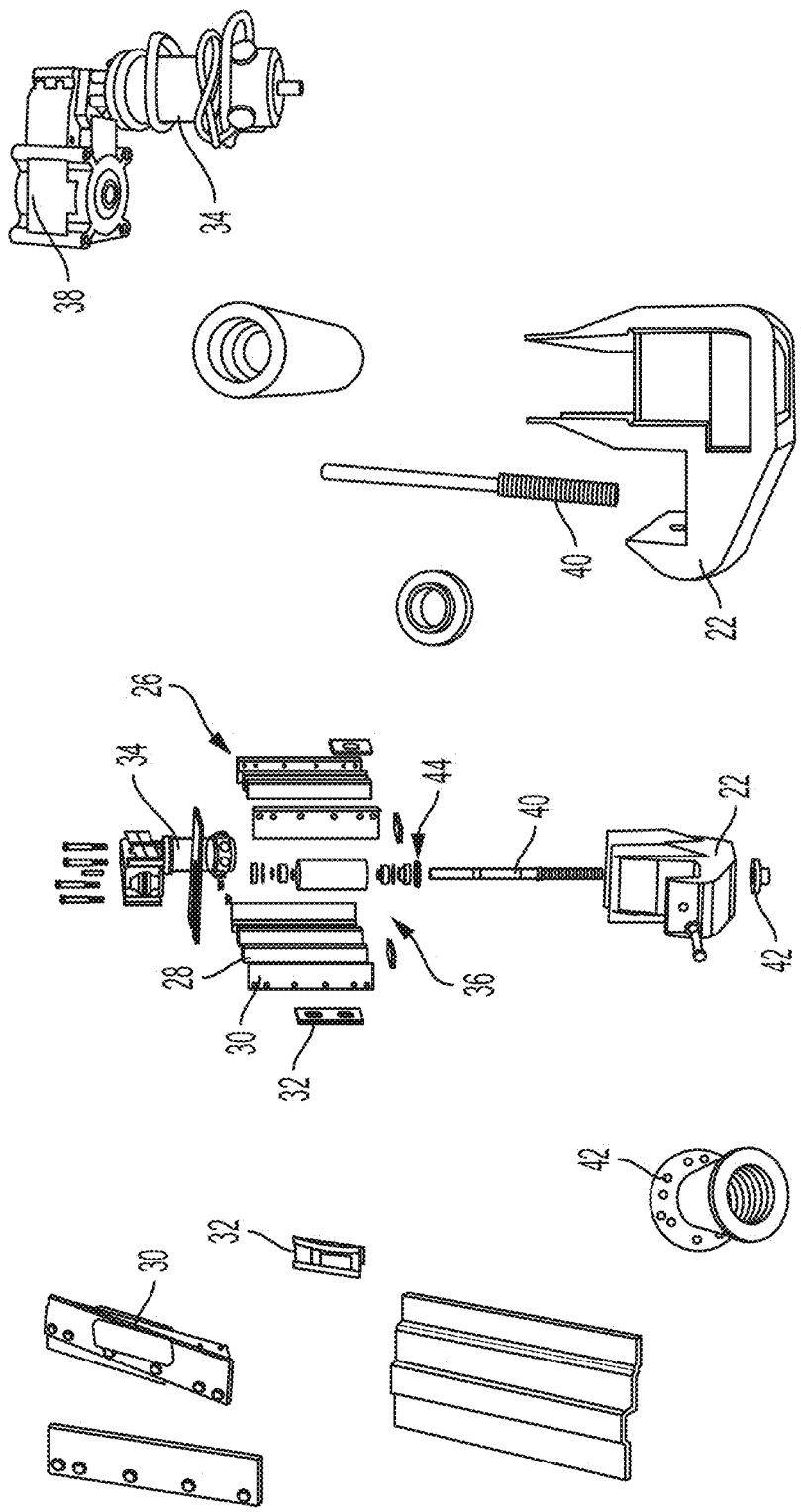
FIG. 7 is a disassembled view of the adjustable suspension mount assembly of FIG. 4.
Figure 10:
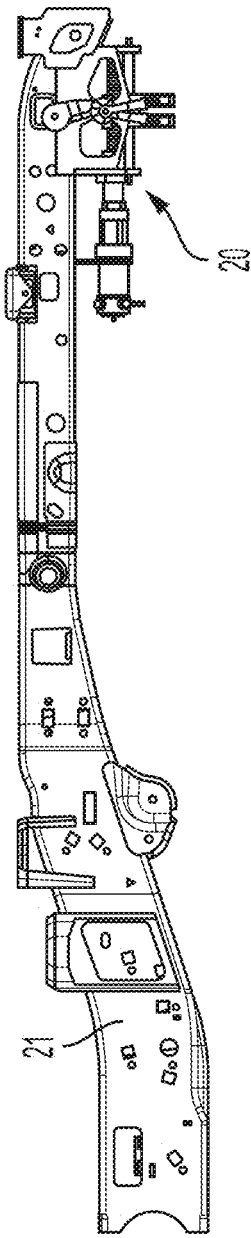
FIG. 10 is a side, elevational view of the vehicle chassis rail having an adjustable suspension mount assembly coupled according to another aspect of the disclosure.
Figure 13:
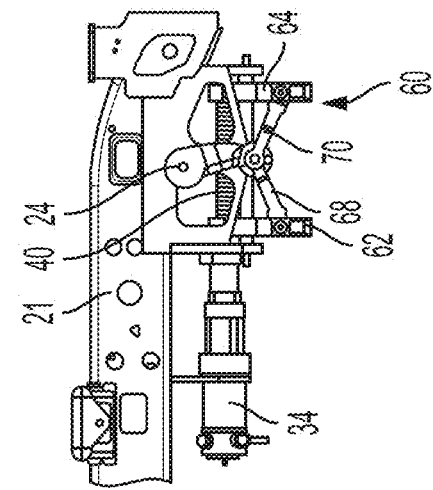
FIG. 13 is a second elevational view of the adjustable suspension mount assembly of FIG. 10.
Figure 12:
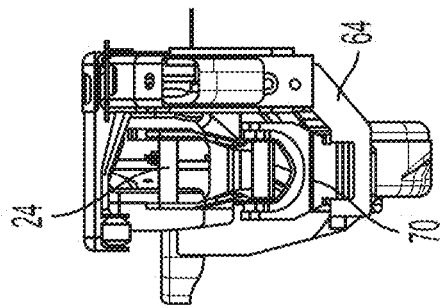
FIG. 12 is a first elevational view of the adjustable suspension mount assembly of FIG. 10.
Figure 11:
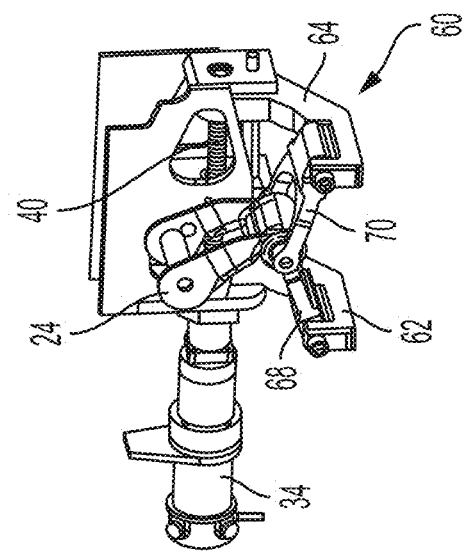
FIG. 11 is a perspective view of the adjustable suspension mount assembly of FIG. 10.

Referring now to FIGS. 4-7, the adjustable suspension mount assembly 20 is shown according to various views, with FIG. 7 illustrating the adjustable suspension mount assembly 20 in a disassembled view. The adjustable suspension mount assembly 20 includes a hanger bracket 22 that is operatively coupled to a suspension mounting component 24. The suspension mounting component 24 is an interface between the portion of the suspension system (e.g., leaf spring or coil spring) that controls the ride characteristics typically associated with suspension operations. Rather than having a fixed (i.e., non-adjustable) interface, the adjustable suspension mount assembly 20 disclosed herein is configured to vertically move the suspension mating interface, as needed. In particular, the hanger bracket 22 slides vertically, upwardly or downwardly, to position the suspension mounting component 24 in a desired position for driving and/or loading conditions.

A vertical slide assembly 26 includes one or more members that form a vertical track for the hanger bracket 22 to slide along or within. As shown in FIG. 7, the vertical slide assembly 26 includes a slide members 28 on each side of the hanger bracket 22, with slider top clamps 30 and gussets 32 in some embodiments to form the overall vertical slide assembly 26. In some embodiments, the slide members 28 are formed of nylon, but alternative suitable materials are contemplated.

An electric motor 34 is provided to drive a vertical actuation assembly 36 via a transmission 38. The vertical actuation assembly 36 may be any suitable vertical drive mechanism. In the illustrated embodiment, the vertical actuation assembly 36 is a lead screw assembly that is formed primarily of a lead screw jack shaft 40 and a lead screw nut 42. Various other nuts, washers and the like 44 are included. The lead screw jack shaft 40 extends through a portion of the hanger bracket 22 and is in threaded engagement with the lead screw nut 42. Operation of the electric motor 34 imparts rotation of the lead screw jack shaft 40 to cause linear motion of the hanger bracket 22 based on positioning of the lead screw nut 42 within the hanger bracket 22. Vertical movement of the hanger bracket 22 vertically adjusts the position of the suspension mounting component 24.

FIGS. 8 and 9 illustrate the vertical actuation assembly 36 in greater detail. In particular, the lead screw jack shaft 40 and the hardware 44 associated therewith are shown in the disassembled view of FIG. 8. Additionally, a boot, or housing 50 is shown. The housing 50 encloses the hardware 44 and a portion of the lead screw jack shaft 40, thereby leaving the portion of the lead screw jack shaft 40 that is needed for interfacing with the transmission 38 at one end and with the lead screw nut 42 at the other end.

FIGS. 4-7 illustrate the adjustable suspension mount assembly 20 as a substantially vertically oriented assembly. In particular, the electric motor 34 and the lead screw assembly 36 are vertically oriented. However, as shown in FIGS. 10-13, the adjustable suspension mount assembly 20 may be a substantially horizontally oriented assembly in some embodiments. In the embodiment of FIGS. 10-13, the electric motor 34 is substantially horizontally oriented and drives the lead screw jack shaft 40, which is also substantially horizontally oriented. In such embodiments, a linkage mechanism 60 is employed to convert the horizontal linear motion of the lead screw assembly 36 to vertical motion of the suspension mounting component 24. The linkage mechanism 60 includes a first link 62 and a second link 64, each of which are in threaded engagement with the lead screw assembly 36. Each of the first and second links 62, 64 are connected to a respective link, referred to as a third link 68 and a fourth link 70. The third and fourth links 68, 70 are operatively coupled to the suspension mounting component 24. In operation, rotation of the lead screw jack shaft 40 causes horizontal linear motion of one or both of the first and second links 62, 64. Horizontal linear motion of the first and second links 62, 64 adjusts the angle of the third and fourth links 68, 70 to impart vertical linear motion of the suspension mounting component 24.

The ability to utilize a substantially horizontal or a substantially vertical adjustable suspension mount assembly 20 advantageously provides packaging customization for different vehicles.

Figure 15:
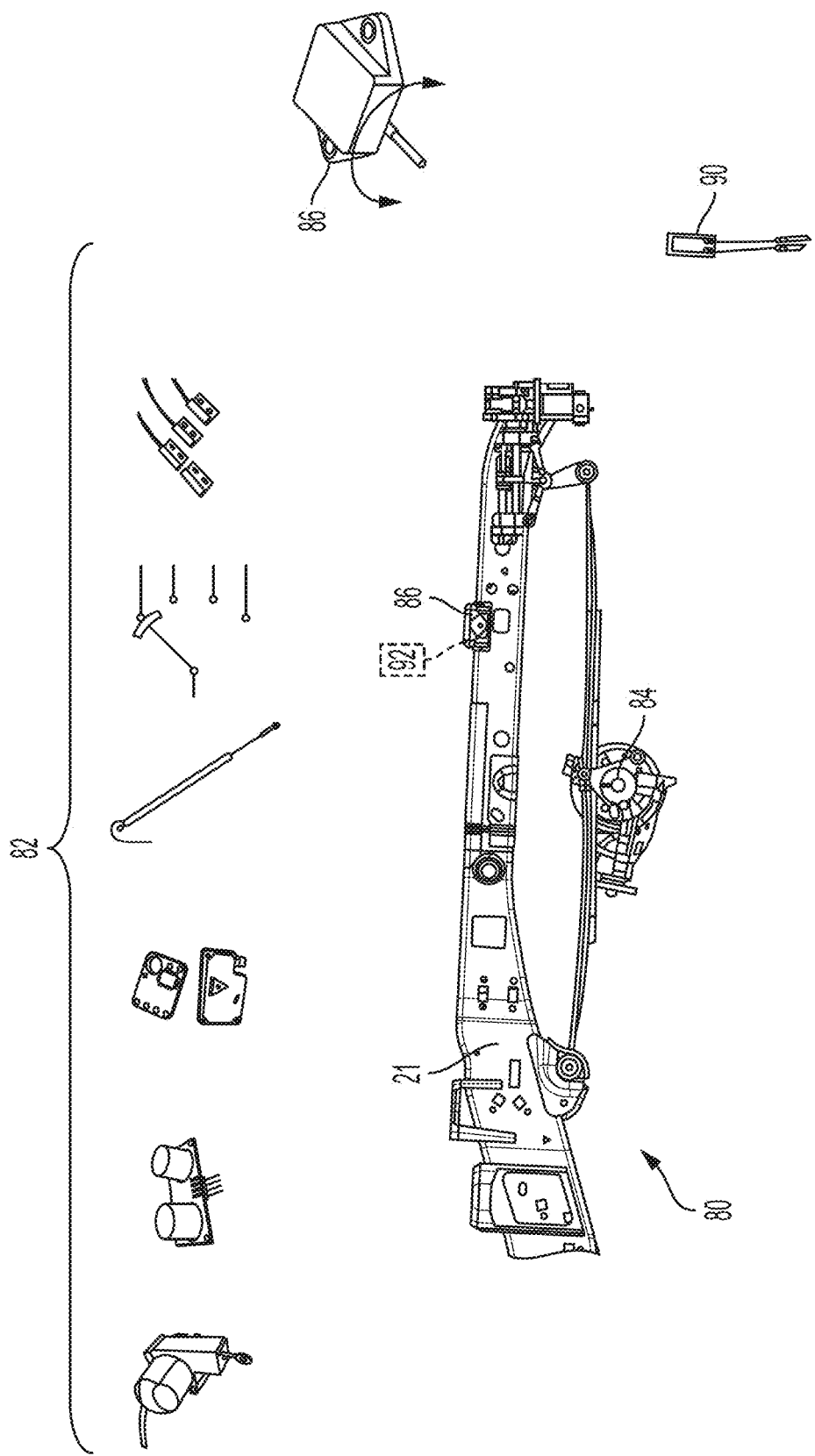
FIG. 15 is a schematic illustration of a suspension monitoring system of the adjustable suspension mount assembly.

Referring now to FIG. 15, a monitoring system 80 is schematically illustrated. The monitoring system 80 includes one or more sub-monitoring systems that monitor various aspects of suspension and vehicle operation.

A distance measuring device 82 is provided to detect the distance between the frame (e.g., chassis rail 21) and an axle 84. The distance measuring device 82 may be any suitable device. For example, a wire potentiometer, an ultrasonic device, a miniature laser ride height sensor, a linear potentiometer, a mechanical position switch and a magnetic position switch may be used as the distance measuring device 82. The preceding list of examples is not intended to be limiting, as other devices may be suitable for various applications. Additionally, a frame inclination monitoring device 86 may be positioned on the frame, such as the chassis rail 21, to detect the tilt orientation of the frame. In some embodiments, a MEMs tilt sensor is utilized as the frame inclination monitoring device 86. A load monitoring component 90, such as a strain gage embedded in the suspension system, is provided to detect the load of the vehicle in some embodiments. The load monitoring component 90 is in operative communication with the frame inclination monitoring device 86.

The above-described monitoring sub-systems, and the monitoring system 80 as a whole, are in operative communication with a processor and/or controller 92 that determines whether adjustment of the suspension system is desirable. If adjustment is necessary, the controller 92 communicates with the electric motor 34 to actuate the vertical linear movement of the suspension mounting component 24. The monitoring system 80 is a fully automated system that automatically detects a need for frame adjustment and carries out the adjustment. However, manual initiation of the adjustment may be possible in some embodiments.

The adjustable suspension mount assembly 20 may be moved vertically upwardly or downwardly. Moving upwardly counteracts the loaded condition described above. Moving downwardly may be utilized to drop the rear portion 12 of the vehicle down 10 to ease loading efforts and assist with fuel economy.

Advantageously, the embodiments described herein separate the frame from the axle of the vehicle and allow adjustment of the frame in an automated manner.

Although the invention has been described in terms of specific embodiments and applications, persons skilled in

Having thus described the invention, it is claimed:

1. An adjustable suspension mount assembly comprising:
   a bracket coupled to a suspension mounting component and coupled to a frame component of the vehicle;
   a leaf spring coupled to the suspension mounting component;
   a vertical adjustment assembly operatively coupled to the bracket;
   an electric motor operatively coupled to the vertical adjustment assembly to adjust the vertical position of the bracket,
   wherein the vertical adjustment assembly comprises:
      a lead screw; and
      a nut, the lead screw rotatably driven by the electric motor, the nut threaded to the lead screw and in operative contact with the bracket to translate the rotatable motion of the lead screw to linear movement of the bracket, wherein the lead screw is oriented vertically; and
   a vertical slide assembly forming a track for the bracket to slide along or within, wherein the vertical slide assembly comprises a pair of slide members, a plurality of slider clamps and a plurality of gussets, wherein each of the slide members is disposed on a respective side of the bracket.

2. The assembly of claim 1, wherein the lead screw extends through an aperture of the bracket.

3. The assembly of claim 1, wherein the electric motor is oriented vertically.

4. The assembly of claim 1, wherein a portion of the lead screw is contained within a boot.

5. The assembly of claim 1, further comprising a monitoring system in operative communication with a processing device and controller for determining at least one vehicle characteristic, the processing device and controller in operative communication with the electric motor to command vertical adjustment of the bracket.

6. The assembly of claim 5, wherein the monitoring system comprises a distance measuring device to detect a distance between the frame and an axle.

7. The assembly of claim 6, wherein the distance measuring device is at least one of a wire potentiometer, an ultrasonic device, a miniature laser ride height sensor, a linear potentiometer, a mechanical position switch, and a magnetic position switch.

8. The assembly of claim 5, wherein the monitoring system comprises a frame inclination monitoring device positioned on the frame to detect a tilt orientation of the frame.

9. The assembly of claim 8, wherein the monitoring system further comprises a load monitoring component in operative communication with the frame inclination monitoring device to detect a load of the vehicle.

10. The assembly of claim 9, wherein the load monitoring component is a strain gage.

11. The assembly of claim 5, wherein the bracket is vertically adjusted in an automated manner with the monitoring system.

12. The assembly of claim 1, wherein the bracket is vertically adjusted upon a manual command by an operator.

13. The assembly of claim 1, wherein the pair of slide members are formed of nylon.

* * * * *